US010732126B2

United States Patent
An et al.

(10) Patent No.: US 10,732,126 B2
(45) Date of Patent: Aug. 4, 2020

(54) METHOD AND APPARATUS FOR INSPECTING DEFECTS ON TRANSPARENT SUBSTRATE AND METHOD EMITTING INCIDENT LIGHT

(71) Applicant: Corning Incorporated, Corning, NY (US)

(72) Inventors: Chong Pyung An, Painted Post, NY (US); Uta-Barbara Goers, Campbell, NY (US); En Hong, Painted Post, NY (US); Sung-chan Hwang, Cheonal-si (KR); Ji Hwa Jung, Seoul (KR); Tae-ho Keem, Seongnam-si (KR); Philip Robert LeBlanc, Corning, NY (US); Hyeong-cheol Lee, Cheonan-si (KR); Michal Mlejnek, Big Flats, NY (US); Johannes Moll, Corning, NY (US); Rajeshkannan Palanisamy, Painted Post, NY (US); Sung-jong Pyo, Asan-si (KR); Amanda Kathryn Thomas, Corning, NY (US); Correy Robert Ustanik, Davidson, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/346,711

(22) PCT Filed: Oct. 31, 2017

(86) PCT No.: PCT/US2017/059220
§ 371 (c)(1),
(2) Date: May 1, 2019

(87) PCT Pub. No.: WO2018/085237
PCT Pub. Date: May 11, 2018

(65) Prior Publication Data
US 2019/0277774 A1    Sep. 12, 2019

Related U.S. Application Data

(60) Provisional application No. 62/416,308, filed on Nov. 2, 2016.

(51) Int. Cl.
*G01N 21/896* (2006.01)
*G01N 21/958* (2006.01)

(52) U.S. Cl.
CPC ......... *G01N 21/896* (2013.01); *G01N 21/958* (2013.01); *G01N 2021/8967* (2013.01)

(58) Field of Classification Search
CPC ......... G01N 2021/8967; G01N 21/896; G01N 21/958
See application file for complete search history.

(56) References Cited

U.S. PATENT DOCUMENTS

| 5,166,752 A | 11/1992 | Spanier et al. |
| 6,266,137 B1 | 7/2001 | Morinaga |

(Continued)

FOREIGN PATENT DOCUMENTS

| JP | 2015038423 A | 2/2015 |
| WO | 0212016 A2 | 2/2002 |

(Continued)

OTHER PUBLICATIONS

International Search Report and Written Opinion of the International Searching Authority; PCT/US2017/59220; dated Jan. 26, 2018; 13 Pages; ISA/US Comissioner for Patents.

*Primary Examiner* — Deoram Persaud (57) ABSTRACT

A method of inspecting defects on a transparent substrate may include: selecting a gradient of an illumination optical system so that light incident on the transparent substrate has (Continued)

a first angle; selecting a gradient of a detection optical system so that an optical axis of the detection optical system located over the transparent substrate has a second angle, which is equal to or less than the first angle; adjusting a position of at least one of the illumination optical system, the transparent substrate, and the detection optical system so that a field-of-view of the detection optical system covers a first region where the light meets a first surface of the transparent substrate and does not cover a second region where light meets a second surface of the transparent substrate, the second surface being opposite to the first surface; illuminating the transparent substrate; and detecting light scattered from the transparent substrate.

20 Claims, 6 Drawing Sheets

(56) References Cited

U.S. PATENT DOCUMENTS

| | | | |
|---|---|---|---|
| 6,424,147 | B1 | 7/2002 | Kato et al. |
| 6,603,542 | B1 | 8/2003 | Chase et al. |
| 6,683,695 | B1 | 1/2004 | Simpson et al. |
| 6,906,749 | B1 | 6/2005 | Fox |
| 6,975,410 | B1 | 12/2005 | Sturgill |
| 7,084,967 | B2 | 8/2006 | Nikoonahad et al. |
| 7,098,055 | B2 | 8/2006 | Noguchi et al. |
| 7,557,913 | B2 | 7/2009 | Otani et al. |
| 7,564,552 | B2 * | 7/2009 | Fielden ............... G03F 7/70916 356/364 |
| 7,567,344 | B2 | 7/2009 | LeBlanc et al. |
| 7,633,625 | B1 * | 12/2009 | Woollam ................. G01J 3/02 356/369 |
| 7,714,996 | B2 | 5/2010 | Yan et al. |
| 8,040,502 | B2 | 10/2011 | Thomas et al. |
| 8,482,728 | B2 | 7/2013 | Uto et al. |
| 8,531,678 | B2 * | 9/2013 | Finarov .................. G01B 11/24 356/614 |
| 8,711,346 | B2 | 4/2014 | Stokowski |
| 2008/0297784 | A1 * | 12/2008 | LeBlanc .............. G01N 21/896 356/239.1 |
| 2009/0059215 | A1 | 3/2009 | Mehanian et al. |
| 2009/0251690 | A1 | 10/2009 | Otani et al. |
| 2010/0325761 | A1 | 12/2010 | Nakata et al. |
| 2011/0019197 | A1 | 1/2011 | Meeks |
| 2011/0194113 | A1 * | 8/2011 | Sakai ..................... G01B 11/06 356/432 |
| 2011/0310244 | A1 | 12/2011 | Schweitzer et al. |
| 2012/0044344 | A1 | 2/2012 | Zheng et al. |
| 2012/0133762 | A1 | 5/2012 | Schweitzer et al. |
| 2012/0224163 | A1 | 9/2012 | Kawanami |
| 2014/0268105 | A1 | 9/2014 | Bills et al. |
| 2014/0307080 | A1 | 10/2014 | Kim et al. |
| 2014/0347664 | A1 | 11/2014 | Schrader et al. |
| 2015/0041666 | A1 | 2/2015 | Chuang et al. |
| 2015/0346109 | A1 * | 12/2015 | Fontaine ................ G01N 21/89 356/239.8 |
| 2016/0011106 | A1 * | 1/2016 | Senoo ................ G01N 21/4738 356/432 |
| 2016/0313494 | A1 * | 10/2016 | Hamilton ............. G02B 6/0036 |
| 2018/0120220 | A1 * | 5/2018 | Liu ..................... G01B 11/0675 |
| 2019/0107498 | A1 * | 4/2019 | Urano .................. G01N 21/956 |
| 2019/0257765 | A1 * | 8/2019 | Goers ................. G01N 21/896 |
| 2019/0277774 | A1 | 9/2019 | An et al. |

FOREIGN PATENT DOCUMENTS

| | | |
|---|---|---|
| WO | 2006108137 A2 | 10/2006 |
| WO | 2017204560 A1 | 11/2017 |

* cited by examiner

METHOD AND APPARATUS FOR INSPECTING DEFECTS ON TRANSPARENT SUBSTRATE AND METHOD EMITTING INCIDENT LIGHT

This is a national stage application under 35 U.S.C. § 371 of International Application No. PCT/US2017/059220, filed on Oct. 31, 2017, which claims the benefit of priority under U.S.C. § 119 of U.S. Provisional Application Ser. No. 62/416,308, filed on Nov. 2, 2016, the content of which is relied upon and incorporated herein by reference in its entirety.

BACKGROUND

Field

One or more embodiments disclosed herein relate to an apparatus and method for inspecting defects by discriminating defects on a transparent substrate and a method of emitting incident light.

Description of the Related Art

Defects on a transparent substrate may be inspected by using an optical method involving emitting light to an object to be inspected and detecting light reflected and scattered from the object to be inspected. In this case, since the emitted light is transmitted through the transparent substrate, not only defects on the first surface (i.e., the surface on which the light is first incidenent) of the object to be inspected but also defects on a second surface being opposite to the first surface or between the first and second surfaces of the object to be inspected, i.e., within the object may be detected.

There is ever increasing demand for a transparent substrate to have minimal surface defects. There is also a need for improved technology for rapidly and accurately discriminating and detecting defects on a first surface of the transparent substrate and defects on a second surface of the transparent substrate.

SUMMARY

One or more embodiments include an apparatus and method for rapidly and accurately detecting nanoscale defects (i.e., defects of about hundreds of nanometers or less) by discriminating defects on a first surface of a transparent substrate and defects on a second surface being opposite to the first surface of the transparent substrate.

Additional aspects will be set forth in part in the description which follows and, in part, will be apparent from the description, or may be learned by practice of the presented embodiments.

According to one or more embodiments, a method of inspecting defects of a transparent substrate includes: selecting a gradient of an illumination optical system so that light emitted from the illumination optical system and incident on the transparent substrate has a first angle relative to a normal direction of the transparent substrate; selecting a gradient of a detection optical system so that an optical axis of the detection optical system located over the transparent substrate has a second angle, which is equal to or less than the first angle, relative to the normal direction of the transparent substrate; adjusting a position of at least one of the illumination optical system, the transparent substrate, and the detection optical system so that a field-of-view of the detection optical system covers a first region where the light meets a first surface of the transparent substrate and does not cover a second region where light transmitted through the transparent substrate meets a second surface of the transparent substrate, the second surface being opposite to the first surface; illuminating the transparent substrate by emitting light from the illumination optical system; and detecting light scattered from the transparent substrate by the detection optical system.

The selecting of the gradient of the illumination optical system may include selecting the first angle so that the first region and a third region do not overlap each other, wherein the third region is a region where the transmitted light is reflected from the second region and meets the first surface of the transparent substrate.

The first angle may be selected according to the following equation:

$$D_{R1R3} = 2 \cdot T \cdot \tan\left(\sin^{-1}\left(\frac{\sin\theta_1}{n}\right)\right) - \frac{W_L}{\cos\theta_1} \geq 0$$

where $D_{R1R3}$ is a separation distance between the first region and the third region, T is a thickness of the transparent substrate, $\theta_1$ is the first angle, n is a refractive index of the transparent substrate, and $W_L$ is a beam width of the incident light.

The position of at least one of the illumination optical system, the transparent substrate, and the detection optical system may be adjusted according to the following equation:

$$D_{R1R2'} \geq D_{FOVR2'} \geq 0$$

where $D_{FOVR2'}$ is a separation distance between the field-of-view and a 2' region, the 2'nd region is a region through which the second region is exposed to the first surface of the transparent substrate when the second region is seen at the second angle, and $D_{R1R2'}$ is a separation distance between the first region and the 2'nd region and is determined by the following equation:

$$D_{R1R2'} = T \cdot \tan\left(\sin^{-1}\left(\frac{\sin\theta_1}{n}\right)\right) - \frac{W_L}{\cos\theta_1} + T \cdot \tan\left(\sin^{-1}\left(\frac{\sin\theta_2}{n}\right)\right)$$

where T is a thickness of the transparent substrate, $\theta_1$ is the first angle, $\theta_2$ is the second angle, n is a refractive index of the transparent substrate, and $W_L$ is a beam width of the incident light.

The method may further include adjusting at least one of a beam width of the illumination optical system and a field-of-view width of the detection optical system so that the field-of-view of the detection optical system is matched to the first region.

The adjusting of at least one of the beam width of the illumination optical system and the field-of-view width of the detection optical system may include adjusting at least one of the beam width of the illumination optical system and the field-of-view width of the detection optical system according to the following equation:

$$\frac{W_L}{\cos\theta_1} = \frac{W_{FOV}}{\cos\theta_2}$$

where $\theta_1$ is the first angle, $\theta_2$ is the second angle, $W_L$ is a beam width of the incident light, and $W_{FOV}$ is the field-of-view width of the detection optical system.

The incident light may be S-polarized.

The method may further include obtaining data indicating an intensity of the scattered light scattered from the transparent substrate according to the gradient of the detection optical system.

The second angle may be selected as a gradient indicating a maximum scattered light intensity based on the data.

The method may further include moving the transparent substrate mounted on a stage, wherein the illuminating and the detecting are simultaneously performed while the transparent substrate is moved.

The detection optical system may include a complementary metal-oxide-semiconductor (CMOS) image sensor using time delay and integration.

The illumination optical system may include a light source configured to generate blue light.

The illumination optical system may include a light source configured to generate light with a wavelength band ranging from about 400 nm to about 500 nm.

After the detecting of the scattered light scattered from the transparent substrate, the method may further include determining portions detected to have a light intensity equal to or greater than a reference light intensity as defects on the first surface of the transparent substrate.

According to one or more embodiments, a method of emitting incident light includes: preparing a transparent substrate; calculating an incidence angle range of light incident on the transparent substrate so that a first region where the incident light meets a first surface of the transparent substrate does not overlap a second region where light transmitted through the transparent substrate and reflected from a second surface of the transparent substrate meets the first surface of the transparent substrate, the second surface being opposite to the first surface; and adjusting a gradient of an illumination optical system that emits the incident light based on the incidence angle range.

An incidence angle of the incident light may be calculated based on the following equation:

$$D = 2 \cdot T \cdot \tan\left(\sin^{-1}\left(\frac{\sin\theta_1}{n}\right)\right) - \frac{W_L}{\cos\theta_1} \geq 0$$

where D is a separation distance between the first region and the second region, T is a thickness of the transparent substrate, $\theta_1$ is the incidence angle, n is a refractive index of the transparent substrate, and $W_L$ is a beam width of the incident light.

The calculating of the incidence angle range and the adjusting of the gradient of the illumination optical system may be performed whenever at least one of a thickness of the transparent substrate, a refractive index of the transparent substrate, and a beam width of the incident light is changed.

According to one or more embodiments, an apparatus for inspecting defects of a transparent substrate includes: a first stage configured to move a transparent substrate mounted on the first stage; an illumination optical system located over the transparent substrate, having an optical axis that is inclined at a first angle relative to a normal direction of the transparent substrate, and including a light source that generates blue light; a detection optical system located over the transparent substrate and including a time delay and integration complementary metal-oxide-semiconductor (TDI CMOS) image sensor having an optical axis that is inclined at a second angle, which is equal to or less than the first angle, relative to the normal direction of the transparent substrate; and a controller configured to calculate a position range of at least one of the illumination optical system, the transparent substrate, and the detection optical system so that a field-of-view of the detection optical system covers a first region where light emitted from the illumination optical system meets a first surface of the transparent substrate and does not cover a second region where light transmitted through the transparent substrate meets a second surface of the transparent substrate, the second surface being opposite to the first surface.

The apparatus may further include a second stage connected to any one of the illumination optical system and the detection optical system and configured to move the illumination optical system or the detection optical system.

The apparatus may further include: a first beam dump located over the transparent substrate to be opposite to the illumination optical system with the transparent substrate therebetween and configured to capture and absorb reflected light reflected from the transparent substrate; and a second beam dump located under the transparent substrate to be opposite to the illumination optical system with the transparent substrate therebetween and configured to capture and absorb transmitted light transmitted through the transparent substrate.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Embodiments herein will be described more fully with reference to the accompanying drawings, in which various embodiments are shown and the same reference numerals denote the same or like parts. It will be understood that, although the terms first, second, etc. may be used herein to describe various components, these components should not be limited by these terms. These terms are only used to distinguish one component from another component.

The terms used in the present disclosure are used to describe embodiments, and an expression used in the singular encompasses the expression of the plural, unless it has a clearly different meaning in the context. In the present disclosure, it is to be understood that the terms such as "including", "having", and "comprising" are intended to indicate the existence of features, numbers, steps, actions, components, parts, or combinations thereof disclosed in the disclosure, and are not intended to preclude the possibility that one or more other features, numbers, steps, actions, components, parts, or combinations thereof may exist or may be added.

All terms including technical and scientific terms used herein have meanings which can be generally understood by one of ordinary skill in the art, if the terms are not particularly defined. General terms defined by dictionaries should be understood to have meanings which can be contextually understood in the art and should not have ideally or excessively formal meanings, if the terms are not defined particularly herein.

When a certain embodiment may be implemented differently, a specific process order may be different from the described order. For example, two consecutively described processes may be performed substantially at the same time or performed in an order opposite to the described order.

Variations from the shapes of the illustrations as a result, for example, of manufacturing techniques and/or tolerances, are to be expected. Thus, embodiments should not be construed as limited to the particular shapes of regions illustrated herein but may be to include deviations in shapes that result, for example, from manufacturing. As used herein, the term "and/or" includes any and all combinations of one or more of the associated listed items.

As used herein, the term "and/or" includes any and all combinations of one or more of the associated listed items. Expressions such as "at least one of" when preceding a list of elements, modify the entire list of elements and do not modify the individual elements of the list.

Figure 1A:
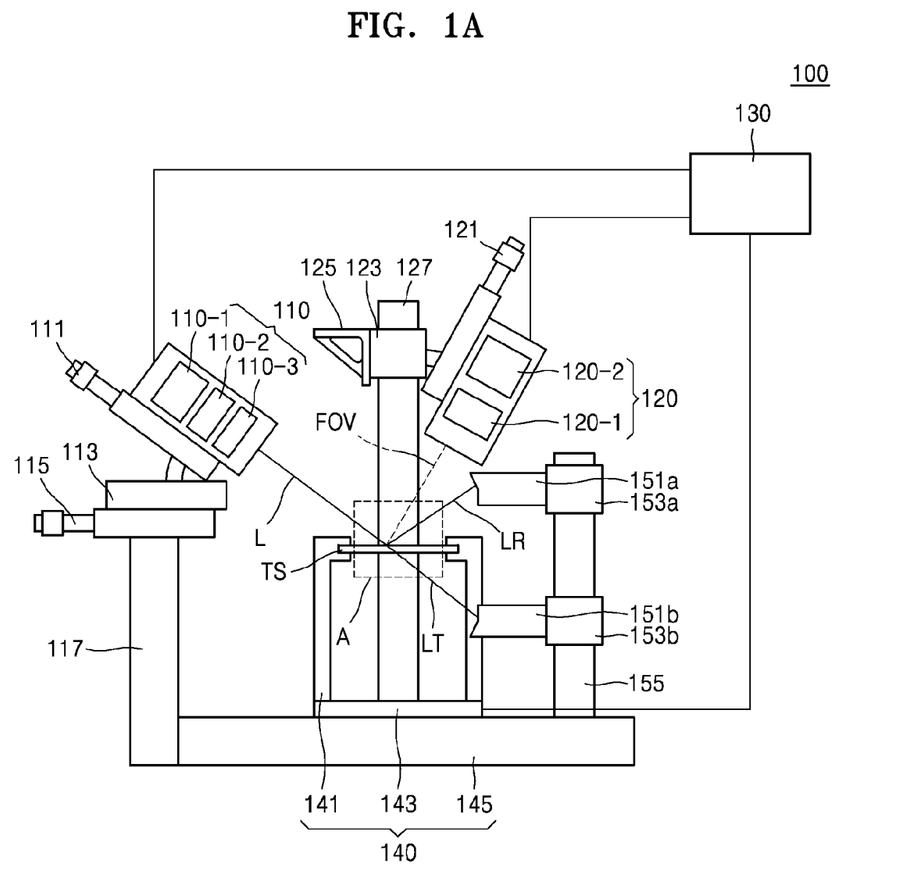
FIG. 1A is a view of an apparatus for detecting defects of a transparent substrate, according to an embodiment.
Figure 1B:
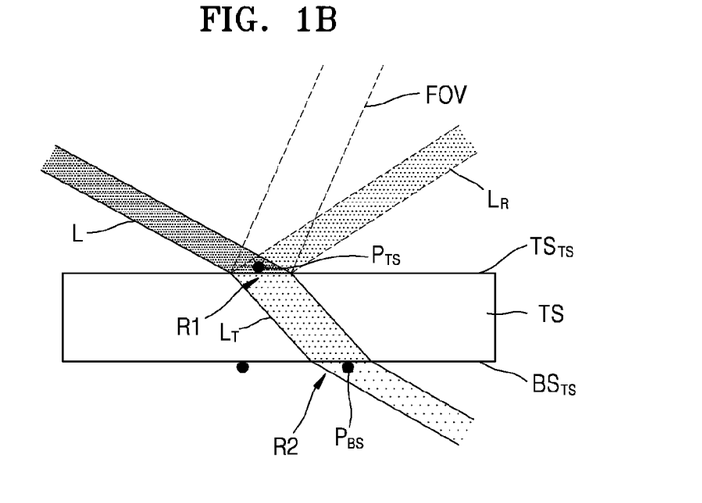
FIG. 1B is an enlarged view of a portion A of FIG. 1A, illustrating incident light, transmitted light, or reflected light of the transparent substrate and a field-of-view of a detection optical system.

FIG. 1A is a view of an apparatus 100 for detecting defects of a transparent substrate TS, according to an embodiment. FIG. 1B is an enlarged view of a portion A of FIG. 1A, illustrating incident light L, transmitted light $L_T$, and reflected light $L_R$ of the transparent substrate TS, and a field-of-view FOV of a detection optical system 120.

Referring to FIGS. 1A and 1B, the apparatus 100 for detecting defects of the transparent substrate TS may include an illumination optical system 110, the detection optical system 120, a controller 130, a first stage 140 on which the transparent substrate TS is mounted, and first and second beam dumps 151a and 151b. The illumination optical system 110 and the detection optical system 120 are inclined at different angles from a normal direction of the transparent substrate TS.

An object to be inspected by the apparatus 100 is the transparent substrate TS. The transparent substrate TS may include a first surface $TS_{TS}$ on which light is incident and a second surface $BS_{TS}$ being opposite to the first surface $TS_{TS}$. Particles $P_{TS}$ and $P_{BS}$ that are foreign materials may respectively exist on the first surface $TS_{TS}$ and the second surface $BS_{TS}$. The particles $P_{TS}$ and $P_{BS}$ may cause defects on the transparent substrate TS in a subsequent process using the transparent substrate TS. In particular, it is necessary to precisely monitor the particles $P_{TS}$ having a size of about hundreds of nanometers or less on the first surface $TS_{TS}$ of the transparent substrate TS.

The transparent substrate TS may be a glass substrate used in a display device such as a liquid crystal display, organic light emitting diode (OLED) display, quantum dots (QD) display and so on. The transparent substrate TS is illustrated as having a thickness that is exaggerated compared to a thickness (e.g., several millimeters to several micrometers) of an actual transparent substrate.

The illumination optical system 110 may be located over the transparent substrate TS to have an optical axis that is inclined at a first angle relative to the normal direction of the transparent substrate TS. The illumination optical system 110 may include a light source 110-1, a polarizer 110-2, and a focusing lens 110-3. The polarizer 110-2 and the focusing lens 110-3 are located in a path of light that is generated from the light source 110-1.

Examples of the light source 110-1 may include a light-emitting device, an illumination device, a lamp, and a beam former. The incident light L may be a ray of light or a laser beam. The light source 110-1 may, for example, generate blue light. In an embodiment, the light source 110-1 may generate light with a wavelength band ranging from about 400 nm to about 500 nm.

The polarizer 110-2 may convert light generated from the light source 110-1 into S-polarized light. In a structure where the illumination optical system 110 and the detection optical system 120 are inclined with the transparent substrate TS therebetween, the detection optical system 120 may have higher efficiency for detecting S-polarized light, which will be explained below in detail with reference to FIG. 6.

The focusing lens 110-3 may focus light generated from the light source 110-1 on an emission region of the transparent substrate TS. That is, the focusing lens 110-3 may adjust a size of the emission region of the transparent substrate TS.

The illumination optical system 110 may be connected to a first angle adjusting member 111. The first angle adjusting member 111 may adjust a gradient of the illumination optical system 110 so that the illumination optical system 110 has a first angle that is inclined relative to the normal direction of the transparent substrate 100.

The illumination optical system 110 and the first angle adjusting member 111 may be mounted on a second stage 113. A position of the illumination optical system 110 may be adjusted by a first position adjusting member 115 that is connected to the second stage 113. The illumination optical system 110, the first angle adjusting member 111, the second stage 113, and the first position adjusting member 115 may be located at a predetermined height from the bottom due to a first support member 117.

The detection optical system 120 may be located opposite to the illumination optical system 110 with the transparent substrate TS therebetween so that the detection optical system 120 has an optical axis that is inclined at a second angle, which is equal to or less than the first angle, relative to the normal direction of the transparent substrate TS. The detection optical system 120 may include an imaging lens 20-1 and a camera 120-2. The imaging lens 120-1 may adjust a range of the field-of-view FOV of the detection optical system 120. The camera 120-2 may be a CMOS image sensor using time delay and integration (TDI) (referred to as the TDI CMOS image sensor). The TDI CMOS image sensor may detect the particles $P_{TS}$ on the transparent substrate TS with high precision while the transparent substrate TS mounted on the first stage 140 is moved. Also, since the TDI CMOS image sensor has a high sensitivity to blue light, the TDI CMOS image sensor may show high detection efficiency even when the particles $P_{TS}$ are tiny and a scattering intensity is low.

The detection optical system 120 may be connected to a second angle adjusting member 121. The second angle adjusting member 121 may adjust a gradient of the detection optical system 120 so that the detection optical system 120 has a second angle that is inclined relative to the normal direction of the transparent substrate 110.

The detection optical system 120 and the second angle adjusting member 121 may be connected to a third stage 123. A position of the detection optical system 120 may be adjusted according to a second support member 127 by a second position adjusting member 125 that is connected to the third stage 123. The detection optical system 120, the second angle adjusting member 121, and the third stage 123 may be located at a predetermined height from the bottom due to the second position adjusting member 125 and the second support member 127.

The controller 130 may calculate a position range of at least one of the illumination optical system 110, the transparent substrate TS, and the detection optical system 120. Accordingly, the detection optical system 120 may minimize light scattered from the particles $P_{BS}$ on the second surface $BS_{TS}$ of the transparent substrate TS, and may detect only light scattered from the particles $P_{TS}$ on the first surface $TS_{TS}$ of the transparent substrate TS. That is, the apparatus 100 may discriminate and detect the particles $P_{TS}$ on the first surface $TS_{TS}$ of the transparent substrate TS and the particles $P_{BS}$ of the second surface $BS_{TS}$ of the transparent substrate TS, which will be explained below in detail with reference to FIG. 4.

The controller 130 may determine portions with a light intensity equal to or greater than a reference light intensity as defects of the first surface $TS_{TS}$ of the transparent substrate TS based on a result obtained after detecting scattered light scattered from the transparent substrate TS and may output a result of the determination. That is, the controller 130 may determine portions with a light intensity equal to or less than the reference light intensity as defects of the second surface $BS_{TS}$ of the transparent substrate TS and may remove the defects from a resultant structure.

In some embodiments, the controller 130 may include a computer including a program storage unit. A program or arbitrary programs for calculating a position range of at least one of the illumination optical system 110, the transparent substrate TS, and the detection optical system 120 and analyzing images may be stored in the program storage unit. Examples of the program storage unit may include a computer-readable hard disk, a flexible disk, a compact disk, a magneto-optical disk, and a memory card.

The transparent substrate TS may be horizontally and vertically moved by the first stage 140. In some embodiments, the first stage 140 may include a third support member 141, a movable member 143, and a transfer member 145. The transparent substrate TS may be connected to the movable member 143 at a predetermined height from the bottom through the third support member 141 that supports ends of the transparent substrate TS. The movable member 143 may be moved on the transfer member 145. However, the first stage 140 is not limited to the above-described configuration. In some embodiments, the first stage 140 may include an air bearing assembly. In this case, vacuum pressure or air pressure may be exerted between the transparent substrate TS and a top surface first surface of the air bearing assembly via air holes formed in the air bearing assembly to support or move the transparent substrate TS. Since the air bearing assembly hardly contacts the transparent substrate TS, the air bearing assembly may protect the transparent substrate TS in a process of detecting defects.

The first and second beam dumps 151a and 151b may remove noise light other than light scattered from the particles $P_{TS}$ on the first surface $TS_{TS}$ of the transparent substrate TS. The first beam dump 151a may be located over the transparent substrate TS to be opposite to the illumination optical system 110 with the transparent substrate TS therebetween. The first beam dump 151a may capture and absorb the reflected light $L_R$ reflected from the first surface $TS_{TS}$ of the transparent substrate TS. The second beam dump 151b may be located under the transparent substrate TS to be opposite to the illumination optical system 110 with the transparent substrate TS therebetween. The second beam dump 151b may capture and absorb the transmitted light $L_T$ transmitted through the transparent substrate TS. In some embodiments, each of the first and second beam dumps 151a and 151b may be formed of a carbon nanotube foil.

The first and second beam dumps 151a and 151b may be fixed to a fourth support member 155 respectively by first and second fixing members 153a and 153b. Although not shown in FIGS. 1A and 1B, position adjusting members may be respectively connected to the first and second fixing members 153a and 153b, and the first and second beam dumps 151a and 151b may be moved by the first and second fixing members 153a and 153b.

Figure 2:
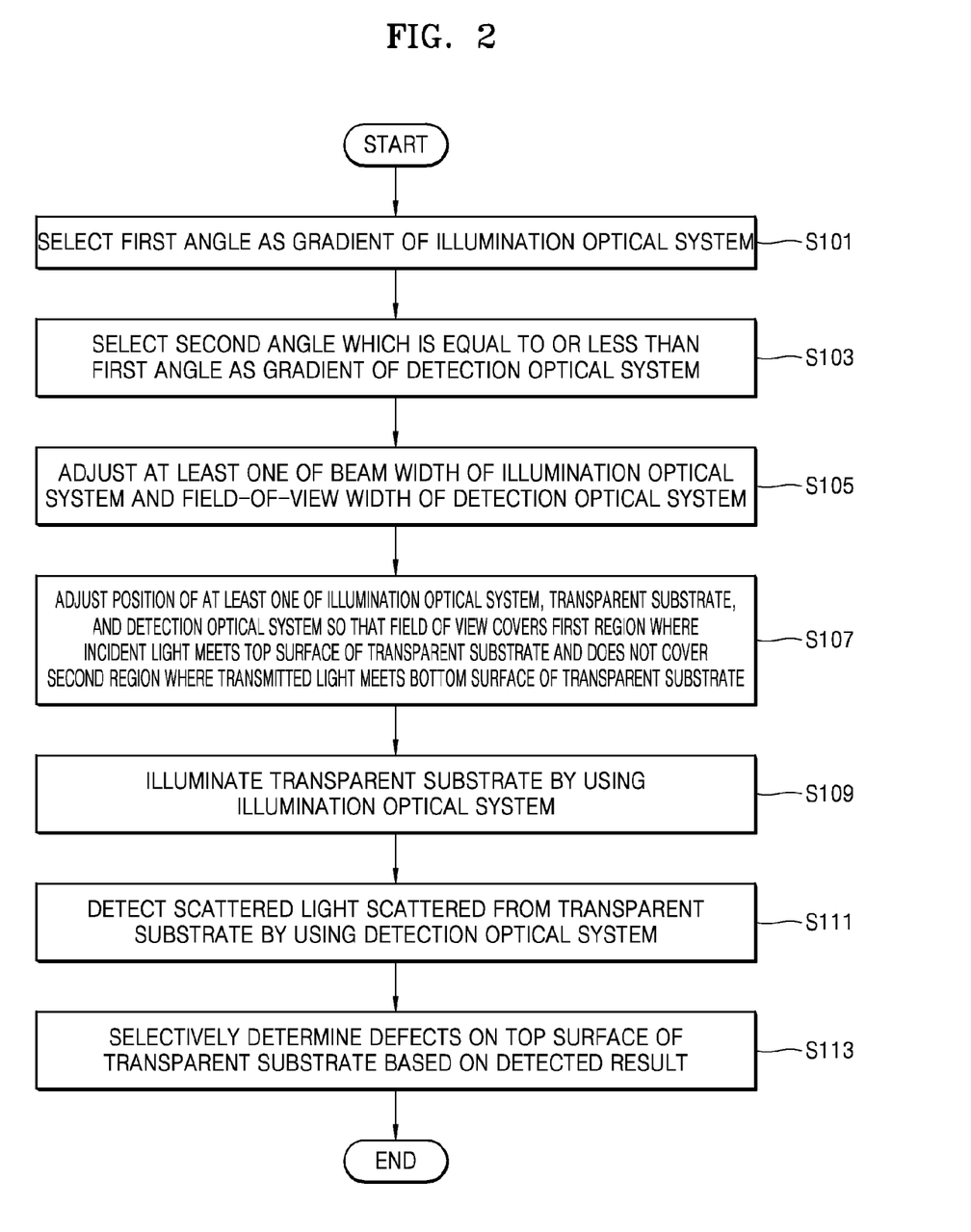
FIG. 2 is a flowchart of a method of detecting defects of the transparent substrate, according to an embodiment.
Figure 3:
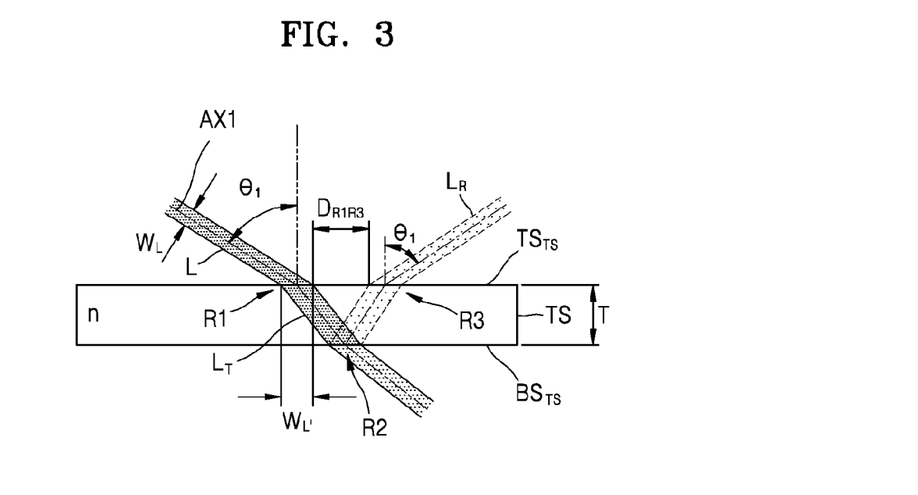
FIG. 3 is an enlarged view of the portion A of FIG. 1A, for explaining an operation of selecting a gradient of an illumination optical system.
Figure 4:
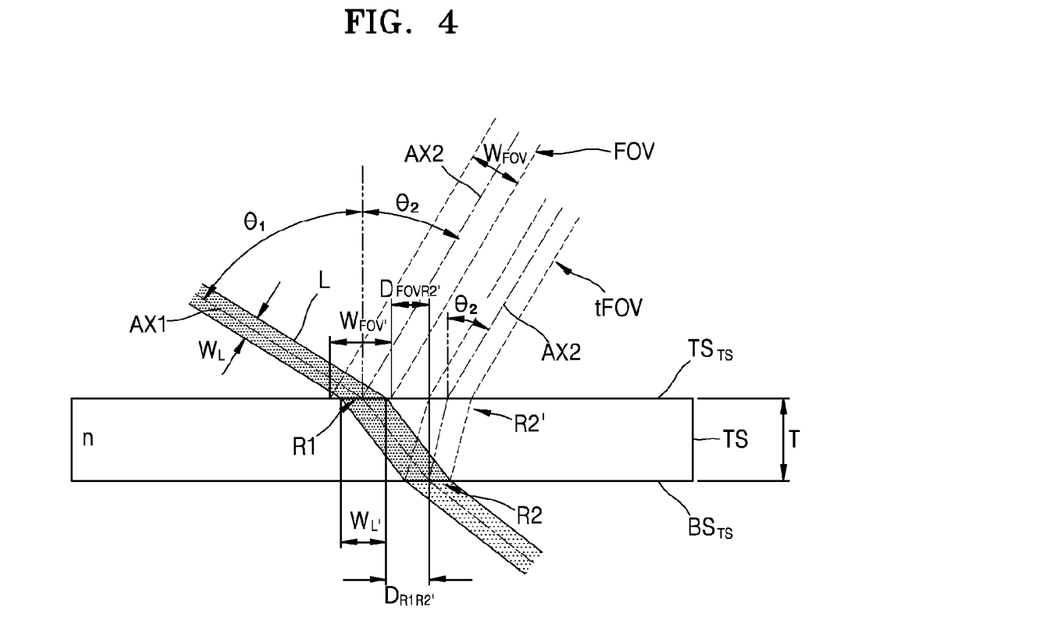
FIG. 4 is an enlarged view of the portion A of FIG. 1A, for explaining an operation of selecting a gradient of the detection optical system and an operation of adjusting positions of the illumination optical system, the transparent substrate, and the detection optical system.

FIG. 2 is a flowchart of a method of detecting defects of the transparent substrate TS according to an embodiment. FIG. 3 is an enlarged view of the portion A of FIG. 1A, for explaining an operation of selecting a gradient of the illumination optical system 110. FIG. 4 is an enlarged view of the portion A of FIG. 1A, for explaining an operation of selecting a gradient of the illumination optical system 110 and a gradient of the detection optical system 120 and an operation of adjusting positions of the illumination optical system 110, the transparent substrate TS, and the detection optical system 120. The method of detecting defects of the transparent substrate TS of FIG. 2 may use the apparatus 100 of FIG. 1A. The same elements are denoted by the same reference numerals, and thus a repeated explanation thereof will not be given.

Referring to FIGS. 1A through 2, in operation S101, a gradient of the illumination optical system 110 may be selected so that an optical axis AX1 of the incident light L emitted from the illumination optical system 110 and incident on the transparent substrate TS has a first angle $\theta_1$ relative to a normal direction of the transparent substrate TS.

A first region R1 may be formed when the incident light L meets the first surface $TS_{TS}$ of the transparent substrate TS. A second region R2 may be formed when the transmitted light $L_T$, from among the incident light L, transmitted through the transparent substrate TS meets the second surface $BS_{TS}$ of the transparent substrate TS. In this case, when there are the particles $P_{BS}$ on the second region R2, light scattered and reflected from the particles $P_{BS}$ on the second region R2 may reach the first region R1. In this case, since light scattered from the particles $P_{TS}$ on the first surface $TS_{TS}$ and light scattered from the particles $P_{BS}$ on the second surface $BS_{TS}$ may be simultaneously detected, the particles $P_{TS}$ on the first surface $TS_{TS}$ and the particles $P_{BS}$ on the second surface $BS_{TS}$ may not discriminated.

Accordingly, an incidence angle of the incident light L may be adjusted so that the influence of light scattered from the second surface $BS_{TS}$ on the first surface $TS_{TS}$ that is a surface to be inspected is minimized.

In detail, a third region R3 may be formed when the transmitted light $L_T$ is reflected from the second region R2 and meets the first surface $TS_{TS}$ of the transparent substrate TS. In this case, the first angle $\theta_1$ may be selected so that the first region R1 and the third region R3 do not overlap each other. Accordingly, the first angle $\theta_1$ may be selected within an incidence angle range calculated according to Equation 1

$$D_{R1R3} = 2 \cdot T \cdot \tan\left(\sin^{-1}\left(\frac{\sin\theta_1}{n}\right)\right) - \frac{W_L}{\cos\theta_1} \geq 0 \quad (1)$$

where $D_{R1R3}$ is a separation distance between the region R1 and the third region R3, T is a thickness of the transparent substrate TS, $\theta_1$ is the first angle, n is a refractive index of the transparent substrate TS, and $W_L$ is a beam width of the incident light L.

Equation 1 may be derived based on the following conditions: The incident light L, the transmitted light $L_T$, and the reflected light $L_R$ are each parallel light and a refractive index of air to which the incident light L is emitted is 1. The incident light L emitted from the illumination optical system 110 may have a first beam width $W_L$, and then may have a second beam width $W_L'$ on the first region R1 when meeting the transparent substrate TS. In this case, the second beam width $W_L'$ and the first beam width $W_L$ have a relationship of $$W_L' = \frac{W_L}{\cos\theta_2}.$$

The transmitted light $L_T$ and the reflected light $L_R$ have the second beam width $W_L'$ on the second and third regions R2 and R3.

As such, an incidence angle range of the incident light L may be calculated by using Equation 1 so that the influence of light scattered from the second surface $BS_{TS}$ of the transparent substrate TS on the first surface $TS_{TS}$ that is a surface to be inspected is minimized. Next, the first angle $\theta_1$ of the illumination optical system 110 may be selected based on the incidence angle range. The calculating of the incidence angle range and the selecting of the gradient of the illumination optical system may be performed whenever at least one of the thickness T of the transparent substrate TS, a refractive index of the transparent substrate TS, and the first beam width $W_L$ of the incident light is changed.

Next, referring to FIGS. 2 and 4, in operation S103, a gradient of the detection optical system 120 may be selected so that an optical axis AX2 of the detection optical system 120 located over the transparent substrate TS has a second angle $\theta_2$ relative to the normal direction of the transparent substrate TS. The optical axis AX2 of the detection optical axis 120 may refer to a light path of the field-of-view FOV of the detection optical system.

In this case, the second angle $\theta_2$ may be selected to be equal to or less than the first angle $\theta_1$. Accordingly, the field-of-view FOV of the detection optical system 120 may not overlap the reflected light $L_R$ reflected from the second surface $BS_{TS}$ of the transparent substrate TS and emitted at the first angle $\theta_1$ from the first surface $TS_{TS}$ of the transparent substrate TS. Accordingly, the detection optical system 120 may minimize the influence of noise due to the reflected light $L_R$ of the second surface $BS_{TS}$.

Also, the second angle $\theta_2$ may be selected as a value indicating a maximum scattering intensity from among scattering intensities according to a gradient of the detection optical system 120. In this case, since an average scattering intensity of S-polarized light is greater than that of P-polarized light, the incident light L may be S-polarized. In some embodiments, when the incident light L that is S-polarized is incident on the transparent substrate TS before operation S103 in which a gradient of the detection optical system 120 is selected, an operation of obtaining data indicating a scattering intensity of light scattered from the transparent substrate TS according to a gradient of the detection optical system 120 may be performed. Next, the second angle $\theta_2$ may be selected as an angle indicating a maximum scattering intensity based on the data, which will be explained below in detail with reference to FIG. 6.

Next, in operation S105, at least one of the first beam width $W_L$ of the illumination optical system 110 and a first field-of-view width $W_{FOV}$ of the detection optical system 120 may be adjusted so that widths of the field-of-view FOV of the detection optical system 120 and the first region R1 are matched to each other.

In detail, the incident light L emitted from the illumination optical system 110 has the first beam width $W_L$ and then has the second beam width $W_L'$ on the first region R1, and the first beam width $W_L$ and the second beam width $W_L'$ have a relationship of $$W_L' = \frac{W_L}{\cos\theta_2}.$$

Likewise, the field-of-view FOV of the detection optical system 120 has a second field-of-view width $W_{FOV}'$ on the transparent substrate TS and the first field-of-view width $W_{FOV}$ and the second field-of-view width $W_{FOV}'$ have a relationship of $$W_{FOV}' = \frac{W_{FOV}}{\cos\theta_2}.$$

Accordingly, at least one of the first beam width WL of the illumination optical system 110 and the first field-of-view width $W_{FOV}$ of the detection optical system 120 may be adjusted according to Equation 4.

$$\frac{W_L}{\cos\theta_1} = \frac{W_{FOV}}{\cos\theta_2}. \quad (4)$$

Noise light may be prevented from being unnecessarily introduced into the detection optical system 120 and the incident light L of the illumination optical system 110 may be prevented from being wasted, by matching the second beam width $W_L'$ and the second field-of-view width $W_{FOV}'$. Although the second beam width $W_L'$ and the second field-of-view width $W_{FOV}'$ are different from each other in FIG. 4 for convenience of explanation, the second beam width $W_L'$ and the second field-of-view width $W_{FOV}'$ may be substantially the same.

Next, in operation S107, a position of at least one of the illumination optical system 110, the transparent substrate TS, and the detection optical system 120 may be adjusted. In this case, relative positions of the illumination optical system 110, the transparent substrate TS, and the detection optical system 120 may be adjusted so that the field-of-view FOV of the detection optical system 120 covers the first region R1 and does not cover the second region R2.

That is, when the field-of-view FOV of the detection optical system 120 covers the second region R2 as well, the detection optical system 120 detects the particles $P_{BS}$ on the second region R2 as well. In this case, since light scattered from the particles $P_{TS}$ on the first surface $TS_{TS}$ and light scattered from the particles $P_{BS}$ on the second surface $BS_{TS}$ are simultaneously detected, the particles $P_{TS}$ on the first surface $TS_{TS}$ and the particles $P_{BS}$ on the second surface $B_{ST}$ may not be distinguished from each other.

Accordingly, positions of the elements may be adjusted so that the field-of-view FOV of the detection optical system 120 covers only the first region R1.

In detail, when the second region R2 is viewed in a field-of-view tFOV of the second angle $\theta_2$ on the transparent substrate TS, the second region R2 may be exposed through a 2'nd region R2' to the first surface $TS_{TS}$ of the transparent substrate TS. Accordingly, the field-of-view FOV of the detection optical system 120 covers the first region R1 and is spaced apart from the 2'nd region R2' by a predetermined separation distance $D_{R1R2'}$. Accordingly, a position of at least one of the illumination optical system 110, the transparent substrate TS, and the detection optical system 120 may be adjusted according to Equation 2.

$$D_{R1R2'} \geq D_{FOVR2'} \geq 0 \quad (2)$$

where $D_{FOVR2'}$ is a separation distance between the field-of-view FOV and the 2'nd region R2' and $D_{R1R2'}$ is a separation distance between the first region R1 and the 2'nd region R2'. The separation distance $D_{FOVR2'}$ and the separation distance $D_{R1R2'}$ may be determined according to Equation 3.

$$D_{R1R2'} = T \cdot \tan\left(\sin^{-1}\left(\frac{\sin\theta_1}{n}\right)\right) - \frac{W_L}{\cos\theta_1} + T \cdot \tan\left(\sin^{-1}\left(\frac{\sin\theta_2}{n}\right)\right) \quad (3)$$

where T is a thickness of the transparent substrate TS, $\theta_1$ is the first angle, $\theta_2$ is the second angle, n is a refractive index of the transparent substrate TS, and $W_L$ is a beam width of the incident light L.

Equation 3 may be derived under the following conditions: The field-of-view FOV may have a third width $W_{FOV}$ and may have a fourth width $W_{FOV}'$ when meeting the transparent substrate TS. In this case, the fourth width $W_{FOV}'$ and the third width $W_{FOV}$ have a relationship of $$W_{FOV}' = \frac{W_{FOV}}{\cos\theta_2}.$$

As such, relative positions of the illumination optical system 110, the transparent substrate TS, and the detection optical system 120 may be adjusted so that the field-of-view FOV of the detection optical system 120 covers only the first region R1, by using Equations 2 and 3. The adjusting of the positions of the illumination optical system 110, the transparent substrate TS, and the detection optical system 120 may be performed whenever at least one of the thickness T of the transparent substrate TS, a refractive index of the transparent substrate TS, the beam width $W_L$ of the incident light L, the first angle $\theta_1$ and the second angle $\theta_2$ is changed.

In operation S109, the illumination optical system 110 and the detection optical system 120 may be set as described above and the transparent substrate TS may be illuminated by using the illumination optical system 110. At the same time, in operation S111, scattered light scattered from the transparent substrate TS may be detected by using the detection optical system 120. Operation S109 in which the transparent substrate TS is illuminated and operation S111 in which scattered light is detected may be simultaneously performed while the transparent substrate TS mounted on the first stage 140 is moved. Accordingly, defects even on the entire transparent substrate TS may be rapidly inspected.

Next, in operation S113, portions detected to have a light intensity equal to or greater than a reference light intensity may be selectively determined as the particles $P_{TS}$ on the first surface $TS_{TS}$ of the transparent substrate TS. As such, the particles $P_{TS}$ on the first surface $TS_{TS}$ of the transparent substrate TS may be detected with high precision by being distinguished from the particles $P_{BS}$ on the second surface $BS_{TS}$, by precisely adjusting a gradient of the illumination optical system 110, a gradient of the detection optical system 120, and a position of each element based on the characteristic that an object to be inspected is a transparent substrate.

Although the particles $P_{TS}$ and $P_{BS}$ respectively exist on the first surface $TS_{TS}$ and the second surface $BS_{TS}$ of the transparent substrate TS, the method of inspecting defects of a transparent substrate according to the disclosure may also be used to inspect general defects other than the particles $P_{TS}$ and $P_{BS}$.

Figure 5:
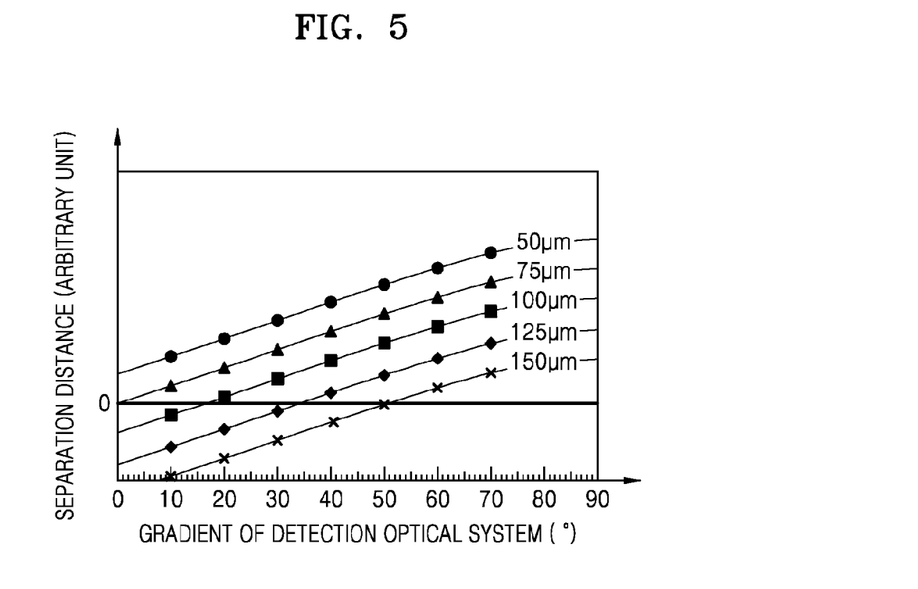
FIG. 5 is a graph illustrating a relationship between a gradient of the detection optical system and a separation distance between a first region and a 2'nd region.

FIG. 5 is a graph illustrating a relationship between the second angle $\theta_2$ of the detection optical system 120, and the separation distance $D_{R1R2'}$ between the first region R1 and the 2'nd region R2'. In this case, the first angle $\theta_1$ of the illumination optical system 110 may be maintained constant.

Referring to FIGS. 1A, 4, and 5, the separation distance $D_{R1R2'}$ between the first region R1 and the 2'nd region R2' may increase as the second angle $\theta_2$ of the detection optical system 120 increases. That is, the risk of noise light of the second region R2 introduced into the field-of-view FOV of the detection optical system 120 may decrease as the second angle $\theta_2$ of the detection optical system 120 increases. Also, according to Equation 2, a variable range of the field-of-view FOV may increase. However, even in this case, the second angle $\theta_2$ of the detection optical system 120 should be selected to be equal to or less than the first angle $\theta_1$ of the illumination optical system 110 as described above in detail.

As a beam width of the incident light L increases to 50 μm, 75 μm, 100 μm, 125 μm, and 150 μm, the separation distance $D_{R1R2'}$ decreases and thus the risk of noise light of the second region R2 introduced into the field-of-view FOV of the detection optical system 120 may increase. Accordingly, as a beam width of the incident light L emitted from the illumination optical system 110 decreases, the influence of the second surface $BS_{TS}$ of the transparent substrate TS may be more effectively reduced.

Figure 6:
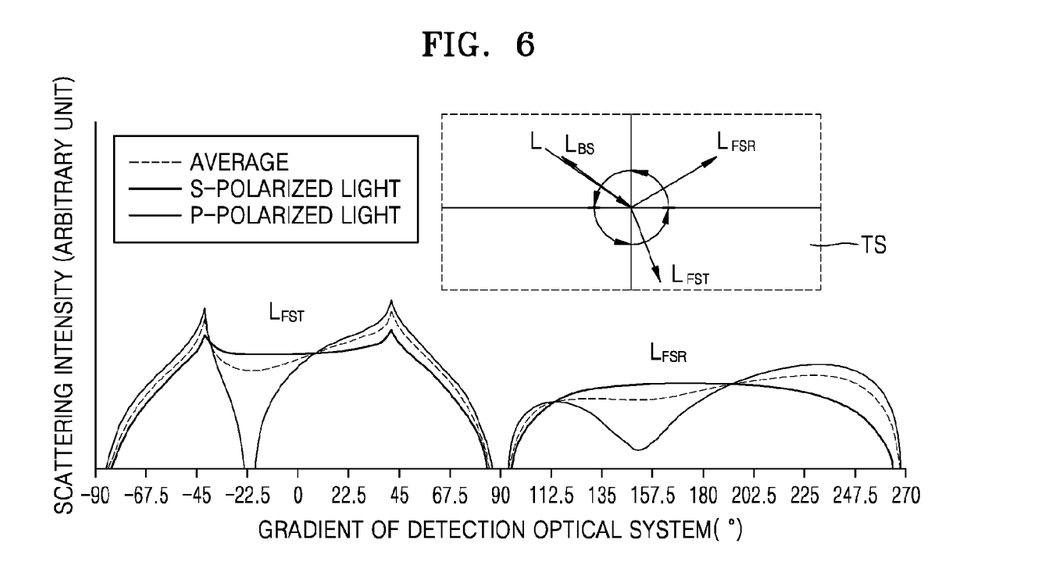
FIG. 6 is a graph illustrating a relationship between a gradient of the detection optical system and a scattering intensity of scattered light.

FIG. 6 is a graph illustrating a relationship between a gradient of the detection optical system 120 and a scattering intensity of scattered light. The horizontal axis of the graph represents an angle that increases counterclockwise from a vertical axis formed in the transparent substrate TS.

Referring to FIG. 6, the incident light L incident on the transparent substrate TS may be scattered due to defects on the first surface of the transparent substrate TS to become backward scattered light $L_{BS}$ or forward scattered light. The forward scattered light may include reflected forward scattered light $L_{FSR}$ reflected from the transparent substrate TS and transmitted forward scattered light $L_{FST}$ transmitted through the transparent substrate TS.

Referring to FIGS. 4 and 6, the detection optical system 120 is located to be opposite to the illumination optical system 110 with the transparent substrate TS therebetween, and the second angle $\theta_2$ of the detection optical system 120 may be selected as a value when the reflected forward scattered light $L_{FSR}$ has a maximum intensity according to a gradient of the detection optical system 120.

Referring to the graph of FIG. 6, in a position range of the detection optical system from 90° to 180°, an intensity of the reflected forward scattered light $L_{FSR}$ when the reflected forward scattered light $L_{FSR}$ is S-polarized is greater than that when the reflected forward scattered light $L_{FSR}$ is not polarized or P-polarized. Accordingly, the illumination optical system 110 emits S-polarized incident light as described above.

When the reflected forward scattered light $L_{FSR}$ is S-polarized, the reflected forward scattered light $L_{FSR}$ has a greatest scattering intensity at a point where a gradient of the detection optical system is about 157.5°. Accordingly, a gradient of the detection optical system may be selected to be about 157.5° at which the reflected forward scattered light $L_{FSR}$ has a greatest intensity. However, the value is based on an incidence angle of a specific illumination optical system, and scattering intensity data according to a gradient of a detection optical system may vary according to an incidence angle of an illumination optical system.

Figure 7:
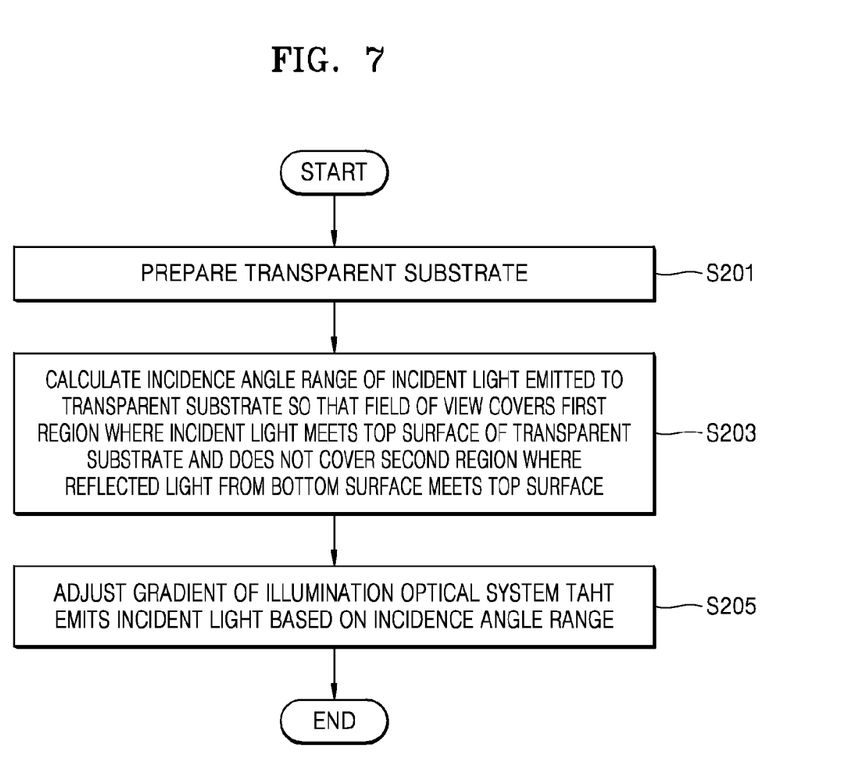
FIG. 7 is a flowchart of a method of emitting incident light to a transparent substrate, according to an embodiment.

FIG. 7 is a flowchart of a method of emitting incident light to a transparent substrate according to an embodiment.

Referring to FIG. 7, in operation S201, a transparent substrate may be prepared. An incidence angle range of incident light emitted to the transparent substrate on the transparent substrate may be calculated. In this case, in operation S203, the incidence angle range may be calculated so that a first region where the incident light meets a first surface of the transparent substrate and a second region where reflected light, from among the incident light, transmitted through the transparent substrate and reflected from a second surface of the transparent substrate meets the first surface of the transparent substrate do not overlap each other. Next, in operation S205, a gradient of an illumination optical system that emits the incident light may be adjusted based on the incidence angle range. In this case, the incidence angle range may be calculated by using Equation 1, as described above in detail with reference to FIG. 2.

According to the disclosure, nanoscale defects may be rapidly and accurately detected by discriminating defects on a first surface of a transparent substrate and defects on a second surface of the transparent substrate.

While the disclosure has been particularly shown and described with reference to embodiments thereof, they are provided for the purposes of illustration and it will be understood by one of ordinary skill in the art that various modifications and equivalent other embodiments can be made from the disclosure. Accordingly, the true technical scope of the disclosure is defined by the technical spirit of the appended claims.

What is claimed is:

1. A method of inspecting defects of a transparent substrate, the method comprising:
    selecting a gradient of an illumination optical system so that light emitted from the illumination optical system and incident on the transparent substrate has a first angle relative to a normal direction of the transparent substrate;
    selecting a gradient of a detection optical system so that an optical axis of the detection optical system located over the transparent substrate has a second angle, which is equal to or less than the first angle, relative to the normal direction of the transparent substrate;
    adjusting a position of at least one of the illumination optical system, the transparent substrate, and the detection optical system so that a field-of-view of the detection optical system covers a first region where the light meets a first surface of the transparent substrate and does not cover a second region where light transmitted through the transparent substrate meets a second surface of the transparent substrate, the second surface being opposite to the first surface;
    illuminating the transparent substrate by emitting light from the illumination optical system; and
    detecting light scattered from the transparent substrate and detected by the detection optical system.

2. The method of claim 1, wherein the selecting of the gradient of the illumination optical system comprises selecting the first angle so that the first region and a third region do not overlap each other,
    wherein the third region is a region where the transmitted light is reflected from the second region and meets the first surface of the transparent substrate.

3. The method of claim 2, wherein the first angle is selected according to the following equation:

$$D_{R1R3} = 2 \cdot T \cdot \tan\left(\sin^{-1}\left(\frac{\sin\theta_1}{n}\right)\right) - \frac{W_L}{\cos\theta_1} \geq 0$$

where $D_{R1R3}$ is a separation distance between the first region and the third region, T is a thickness of the transparent substrate, $\theta_1$ is the first angle, n is a refractive index of the transparent substrate, and $W_L$ is a beam width of the incident light.

4. The method of claim 1, wherein the position of at least one of the illumination optical system, the transparent substrate, and the detection optical system is adjusted according to the following equation:

$$D_{R1R2'} \geq D_{FOVR2'} \geq 0$$

where $D_{FOVR2'}$ is a separation distance between the field-of-view and a 2'nd region, the 2'nd region is a region through which the second region is exposed to the first surface of the transparent substrate when the second region is seen at the second angle, and $D_{R1R2'}$ is a separation distance between the first region and the 2'nd region and is determined by the following equation:

$$D_{R1R2'} = T \cdot \tan\left(\sin^{-1}\left(\frac{\sin\theta_1}{n}\right)\right) - \frac{W_L}{\cos\theta_1} + T \cdot \tan\left(\sin^{-1}\left(\frac{\sin\theta_2}{n}\right)\right)$$

where T is a thickness of the transparent substrate, $\theta_1$ is the first angle, $\theta_2$ is the second angle, n is a refractive index of the transparent substrate, and $W_L$ is a beam width of the incident light.

5. The method of claim 1, further comprising adjusting at least one of a beam width of the illumination optical system and a field-of-view width of the detection optical system so that the field-of-view width of the detection optical system is matched to the width of the first region.

6. The method of claim 5, wherein the adjusting of at least one of the beam width of the illumination optical system and the field-of-view width of the detection optical system comprises adjusting at least one of the beam width of the illumination optical system and the field-of-view width of the detection optical system according to the following equation:

$$\frac{W_L}{\cos\theta_1} = \frac{W_{FOV}}{\cos\theta_2}$$

where $\theta_1$ is the first angle, $\theta_2$ is the second angle, $W_L$ is a beam width of the incident light, and $W_{FOV}$ is the field-of-view width of the detection optical system.

7. The method of claim 1, wherein the incident light is S-polarized.

8. The method of claim 7, further comprising obtaining data indicating an intensity of the scattered light scattered from the transparent substrate according to the gradient of the detection optical system.

9. The method of claim 8, wherein the second angle is selected as a gradient indicating a maximum scattered light intensity based on the data.

10. The method of claim 1, further comprising moving the transparent substrate mounted on a stage,
wherein the illuminating and the detecting are simultaneously performed while the transparent substrate is moved.

11. The method of claim 10, wherein the detection optical system comprises a complementary metal-oxide-semiconductor (CMOS) image sensor using time delay and integration.

12. The method of claim 1, wherein the illumination optical system comprises a light source configured to generate blue light.

13. The method of claim 1, wherein the illumination optical system comprises a light source configured to generate light with a wavelength band ranging from about 400 nm to about 500 nm.

14. The method of claim 1, further comprising, after the detecting of the scattered light scattered from the transparent substrate, determining portions detected to have a light intensity equal to or greater than a reference light intensity as defects on the first surface of the transparent substrate.

15. A method of emitting incident light, the method comprising:
preparing a transparent substrate;
calculating an incidence angle range of light emitted on the transparent substrate so that a first region where the incident light meets a first surface of the transparent substrate does not overlap a second region where light transmitted through the transparent substrate and reflected from a second surface of the transparent substrate meets the first surface of the transparent substrate, the second surface being opposite to the first surface; and
adjusting a gradient of an illumination optical system that emits the incident light based on the incidence angle range.

16. The method of claim 15, wherein an incidence angle of the incident light is calculated based on the following equation:

$$D = 2 \cdot T \cdot \tan\left(\sin^{-1}\left(\frac{\sin\theta_1}{n}\right)\right) - \frac{W_L}{\cos\theta_1} \geq 0$$

where D is a separation distance between the first region and the second region, T is a thickness of the transparent substrate, $\theta_1$ is the incidence angle, n is a refractive index of the transparent substrate, and $W_L$ is a beam width of the incident light.

17. The method of claim 15, wherein the calculating of the incidence angle range and the adjusting of the gradient of the illumination optical system are performed whenever at least one of a thickness of the transparent substrate, a refractive index of the transparent substrate, and a beam width of the incident light is changed.

18. An apparatus for inspecting defects of a transparent substrate, the apparatus comprising:
a first stage configured to move a transparent substrate mounted on the first stage;
an illumination optical system located over the transparent substrate, having an optical axis that is inclined at a first angle relative to a normal direction of the transparent substrate, and comprising a light source that generates blue light;
a detection optical system located over the transparent substrate and comprising a time delay and integration complementary metal-oxide-semiconductor (TDI CMOS) image sensor having an optical axis that is inclined at a second angle, which is equal to or less than the first angle, relative to the normal direction of the transparent substrate; and
a controller configured to calculate a position range of at least one of the illumination optical system, the transparent substrate, and the detection optical system so that a field-of-view of the detection optical system covers a first region where light emitted from the illumination optical system meets a first surface of the transparent substrate and does not cover a second region where light transmitted through the transparent substrate meets a second surface of the transparent substrate, the second surface being opposite to the first surface.

19. The apparatus of claim 18, further comprising a second stage connected to any one of the illumination optical system and the detection optical system and configured to move the illumination optical system or the detection optical system.

20. The apparatus of claim 18, further comprising:
a first beam dump located over the transparent substrate to be opposite to the illumination optical system with the transparent substrate therebetween and configured to capture and absorb reflected light reflected from the transparent substrate; and
a second beam dump located under the transparent substrate to be opposite to the illumination optical system with the transparent substrate therebetween and configured to capture and absorb transmitted light transmitted through the transparent substrate.

* * * * *

UNITED STATES PATENT AND TRADEMARK OFFICE
CERTIFICATE OF CORRECTION

| | |
|---|---|
| PATENT NO. | : 10,732,126 B2 |
| APPLICATION NO. | : 16/346711 |
| DATED | : August 4, 2020 |
| INVENTOR(S) | : Chong Pyung An et al. |

It is certified that error appears in the above-identified patent and that said Letters Patent is hereby corrected as shown below:

On the Title Page

In Column 1, item (54), Title, Line 3, after "METHOD" insert -- OF --.

In Column 1, item (72), Inventors, Line 4, delete "Cheonal-si," and insert -- Cheonan-si, --, therefor.

In Column 2, item (56), Other Publications, Line 3, delete "Comissioner" and insert -- Commissioner --, therefor.

In the Specification

In Column 1, Line 3, after "METHOD" insert -- OF --.

In the Claims

In Column 14, Line 44 (approx.), Claim 4, delete "$D_{R1R2}{\geq}D_{FOVR2}{\geq}0$" and insert -- $D_{R1R2'} \geq D_{FOVR2'} \geq 0$ --, therefor.

Signed and Sealed this
Sixth Day of September, 2022

Katherine Kelly Vidal
*Director of the United States Patent and Trademark Office*